US012689168B1

(12) United States Patent
Tao

(10) Patent No.: US 12,689,168 B1
(45) Date of Patent: Jul. 21, 2026

(54) POWER PLUG CAPABLE OF 360° ROTATION

(71) Applicant: Ningbo Liteshun Electric Co., LTD, Yuyao (CN)

(72) Inventor: Jiahuan Tao, Yuyao (CN)

(73) Assignee: Ningbo Liteshun Electric Co., LTD, Yuyao (CN)

( * ) Notice: Subject to any disclaimer, the term of this patent is extended or adjusted under 35 U.S.C. 154(b) by 0 days.

(21) Appl. No.: 19/382,314

(22) Filed: Nov. 7, 2025

(30) Foreign Application Priority Data

Oct. 15, 2025 (CN) ........................ 202522184109.1

(51) Int. Cl.
*H01R 35/04* (2006.01)
*H01R 13/26* (2006.01)
*H01R 13/502* (2006.01)
*H01R 13/04* (2006.01)

(52) U.S. Cl.
CPC ............ *H01R 35/04* (2013.01); *H01R 13/26* (2013.01); *H01R 13/502* (2013.01); *H01R 13/04* (2013.01)

(58) Field of Classification Search
CPC ... H01R 35/04; H01R 13/514; H01R 13/6315
USPC ..................................................... 439/11, 13
See application file for complete search history.

(56) References Cited

U.S. PATENT DOCUMENTS 7,497,740 B2 * 3/2009 Mei ...................... H01R 25/003 439/651
7,819,665 B1 * 10/2010 Nishizawa ............. H01R 31/06 439/13
8,079,877 B1 * 12/2011 Lai ....................... H01R 31/065 439/655
8,147,097 B1 * 4/2012 Hsiao ........................ A61L 9/03 439/11
8,221,131 B1 * 7/2012 Mazyck ............... H01R 9/2408 439/13
8,366,462 B2 * 2/2013 Kuo ....................... H01R 24/30 439/131
8,388,352 B1 * 3/2013 ChongYu ............... H01R 35/04 439/11
8,469,730 B2 * 6/2013 Garb .................... H01R 31/065 439/166
8,512,056 B2 * 8/2013 Wen ..................... H01R 13/625 439/172
10,418,768 B1 * 9/2019 Xiao ...................... H01R 35/04
11,322,883 B1 * 5/2022 Potterf ............... H01R 13/7036
(Continued)

FOREIGN PATENT DOCUMENTS

CN 103208693 B * 8/2015

*Primary Examiner* — Marcus E Harcum

(57) ABSTRACT

Disclosed is a power plug capable of 360° rotation, relating to the field of plugs. The power plug includes a housing, a rotating member, and a locking structure. The rotating member is rotatably connected to the housing. The rotating member is provided with a pin. The pin rotates synchronously with the rotating member. The locking structure includes a locking member slidably connected to either the housing or the rotating member. The locking member is adapted to lock or unlock a relative rotation between the rotating member and the housing. The locking member locks the relative rotation between the housing and the rotating member, thereby prolonging the service life of the power plug, improving the convenience during assembly, and ensuring a reliable electrical connection.

15 Claims, 6 Drawing Sheets

(56) References Cited

U.S. PATENT DOCUMENTS

| | | | | |
|---|---|---|---|---|
| 11,476,627 B2 * | 10/2022 | Pan | H01R 35/04 | |
| 2001/0018277 A1 * | 8/2001 | Gerard | H01R 35/04 | 439/13 |
| 2009/0038928 A1 * | 2/2009 | Patel | H01R 39/64 | 200/570 |
| 2009/0227122 A1 * | 9/2009 | Jubelirer | H01R 31/065 | 439/11 |
| 2010/0015819 A1 * | 1/2010 | Tedeschi | H01R 29/00 | 439/13 |
| 2012/0178305 A1 * | 7/2012 | Chen | H01R 35/04 | 439/660 |
| 2022/0285900 A1 * | 9/2022 | Pan | H01R 35/04 | |
| 2023/0140080 A1 * | 5/2023 | Galazin | H01R 25/003 | 174/53 |
| 2025/0234123 A1 * | 7/2025 | Teetzel | H04R 1/105 | |

* cited by examiner

POWER PLUG CAPABLE OF 360° ROTATION

CROSS REFERENCE TO RELATED APPLICATIONS

The present application claims the benefit of Chinese Patent Application No. 2025221841091 filed on Oct. 15, 2025, the contents of which are incorporated herein by reference in their entirety.

TECHNICAL FIELD

The disclosure herein relates to the technical field of plugs, and in particular, to a power plug capable of 360° rotation.

BACKGROUND

A pin on an existing power plug can rotate freely relative to a plug housing. Therefore, after the pin is inserted into a socket, the plug housing can be rotated, so that the plug housing drives a power line to adjust a position and angle thereof, preventing the power line from being bent and thus prolonging the service life of the power plug. However, after the plug housing drives the power line to rotate relative to the pin, since there is no locking structure to lock and limit the rotation of the housing, the plug housing and the power line will rotate freely under the action of gravity and hang down. When the socket is located in a space close to the ground or a tabletop, the power line will still be bent, affecting the service life of the power plug.

SUMMARY

To resolve at least one of the foregoing problems, the disclosure herein provides a power plug capable of 360° rotation. The power plug includes a housing, a rotating member, and a locking structure. The rotating member is rotatably connected to the housing. The rotating member is provided with a pin. The pin rotates synchronously with the rotating member. The locking structure includes a locking member slidably connected to either the housing or the rotating member. The locking member is adapted to lock or unlock a relative rotation between the rotating member and the housing.

Optionally, the locking member is slidably arranged in the housing. A plurality of locking slots are circumferentially spaced apart on an outer wall of the rotating member. The locking member is adapted to be inserted into any one of the locking slots to lock the rotation of the rotating member.

Optionally, the locking structure further includes an elastic member. The elastic member is in contact with the locking member so as to drive the locking member to keep the rotating member in a locked state all the time.

Optionally, an unlocking button is slidably arranged on the housing. One end of the unlocking button is in contact with the locking member, and the other end is exposed outside the housing. When a pressing force is applied to the unlocking button, the unlocking button drives the locking member to move, so as to unlock the rotation of the rotating member.

Optionally, the locking member is provided with an inclined surface. One end of the unlocking button abuts against the inclined surface so as to drive the locking member to move.

Optionally, the unlocking button is provided with an inclined cooperating surface parallel to the inclined surface. A plurality of protrusions are spaced apart on the inclined cooperating surface. The protrusions abut against the inclined surface.

Optionally, the housing includes a first shell and a second shell connected to the first shell. A rotating groove is provided on the side of the second shell close to the first shell. The rotating member is rotatably installed in the rotating groove. The locking member is directionally slidably arranged in the second shell. A rotating hole for the pin to pass through is provided at the bottom of the rotating groove. The rotating hole extends through the second shell.

Optionally, the pin includes a first pin, a second pin, and a third pin, which are spaced apart. A conductive assembly electrically connected to a power line is arranged on the side of the first shell close to the second shell. The first pin, the second pin, and the third pin are all electrically connected to the conductive assembly.

Optionally, the conductive assembly includes a base, a first conductive ring plate, a conductive pin, a second conductive ring plate, and a first conductive plate, which are integrally installed on the base. The first conductive ring plate, the conductive pin, and the first conductive plate are spaced apart and all fixedly connected to the base. The first conductive ring plate, the conductive pin, and the first conductive plate are all connected to the power line. The second conductive ring plate is connected to the rotating member and rotates synchronously therewith. The third pin is fixedly connected to the second conductive ring plate. The second conductive ring plate keeps an electrical contact with the first conductive plate all the time when rotating relative to the base. When the rotating member drives the first pin to rotate, the first pin keeps an electrical contact with the first conductive ring plate all the time. The conductive pin is formed with an insertion chamber. The second pin is fixedly provided with a conductive column. The conductive column is rotatably inserted into the insertion chamber and keeps an electrical contact with the conductive pin all the time.

Optionally, the first conductive plate is bent to form a plurality of first bent portions. The plurality of first bent portions are all in electrical contact with the second conductive ring plate. A second conductive plate is fixedly connected to the first pin. The second conductive plate is bent to form a plurality of second bent portions. The plurality of second bent portions are all in electrical contact with the first conductive ring plate.

Compared with the prior art, the disclosure herein has the following beneficial effects.

1. After driving the housing to rotate relative to the rotating member and the pin, the orientation of the power line can be adjusted. Then the locking member will lock the relative rotation between the housing and the rotating member, preventing the housing and the power line from rotating relative to the rotating member under their own gravity or external force, avoiding excessive bending caused by the sagging of a connection point between the power line and the housing, and prolonging the service life of the power plug.

2. The arrangement of the unlocking button improves the convenience during unlocking for unlocking operation. Meanwhile, a structure where the unlocking button pushes the inclined surface to move the locking member during unlocking is relatively simple, reducing production and manufacturing costs. The arrangement of the plurality of protrusions on the unlocking button not only ensures stable cooperation between the unlocking button and the inclined surface, but also reduces the contact area between the unlocking button and the inclined surface, thereby reducing friction, and making unlocking more labor-saving and smooth.

3. The first conductive ring plate, the conductive pin, and the first conductive plate are integrated on the base to form a module, improving the convenience during assembly, and also ensuring that the first pin, the second pin, and the third pin can still keep a reliable electrical connection with the power line after rotating at any angle along with the rotating member, achieving high stability.

4. The arrangement of the plurality of first bent portions and the plurality of second bent portions increases electrical connection contacts. If one of the first bent portions or second bent portions loses a conductive function, the remaining first bent portions and second bent portions can still act as electrical connection contacts, thereby improving the stability of electrical conduction for the pin.

Figure 1:
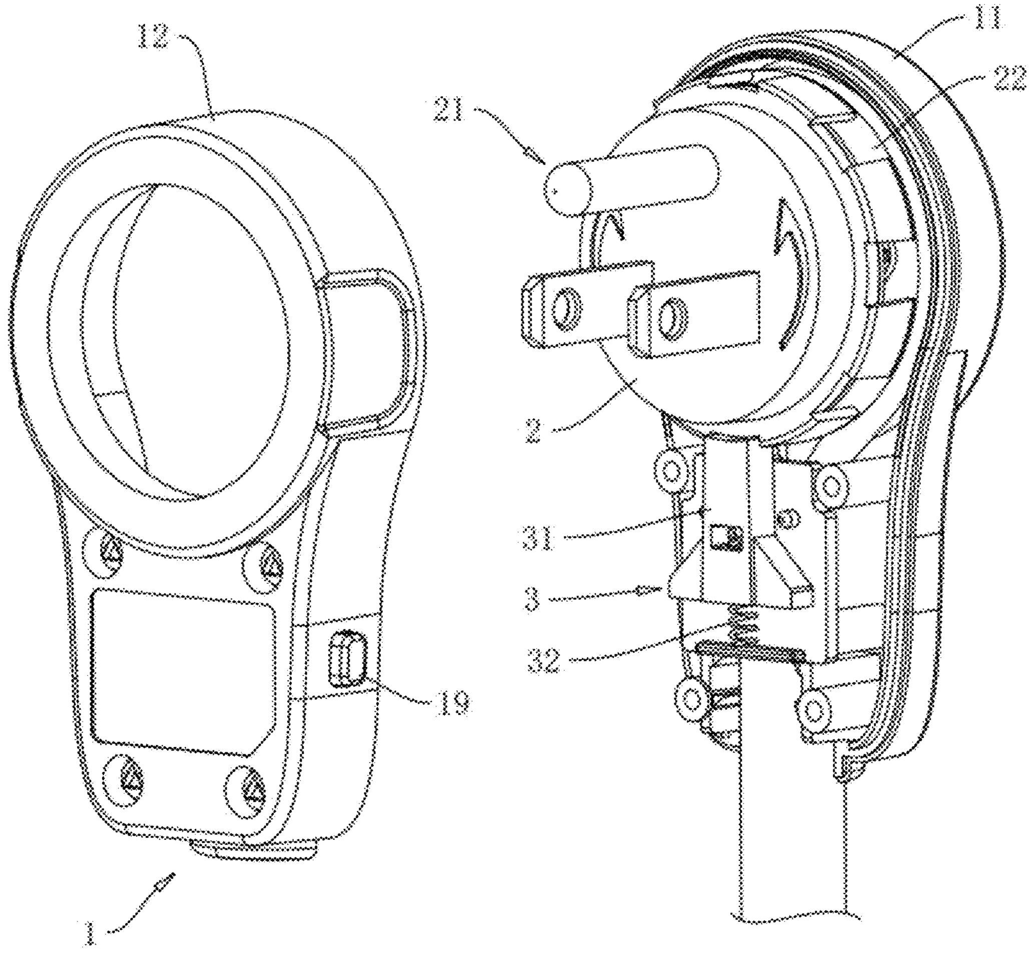
FIG. 1 is an exploded view 1 of a power plug according to an example of the disclosure herein.

Reference numerals: 1: housing; 11: first shell; 12: second shell; 121: rotating groove; 122: sliding groove; 13: base; 14: first conductive ring plate; 141: fixed leg; 142: connecting leg; 15: conductive pin; 16: second conductive ring plate; 17: first conductive plate; 171: conductive connecting column; 172: first bent portion; 18: second conductive plate; 181: second bent portion; 19: unlocking button; 191: protrusion; 2: rotating member; 21: pin; 22: locking slot; 23: conductive column; 3: locking structure; 31: locking member; 311: inclined surface; and 32: elastic member.

DETAILED DESCRIPTION

To make the foregoing objectives, features, and advantages of the disclosure herein more obvious and understandable, the disclosure herein will be further described in detail below in conjunction with FIGS. 1 to 6.

An example of the disclosure herein provides a power plug capable of 360° rotation. Referring to FIG. 1, the power plug capable of 360° rotation includes a housing 1, a rotating member 2, and a locking structure 3. The rotating member 2 is provided with a pin 21. The pin 21 is configured for insertion connection and electrical connection with a jack of a socket. The rotating member 2 is rotatably connected to the housing 1. The pin 21 rotates synchronously with the rotating member 2, so that the orientation of a power line connected to the power plug can be adjusted. The locking structure 3 is adapted to lock or unlock a relative rotation between the rotating member 2 and the housing 1, preventing the housing 1 and the power line from rotating relative to the rotating member 2 under their own gravity or external force, and avoiding excessive bending caused by the sagging of a connection point between the power line and the housing 1.

Figure 2:
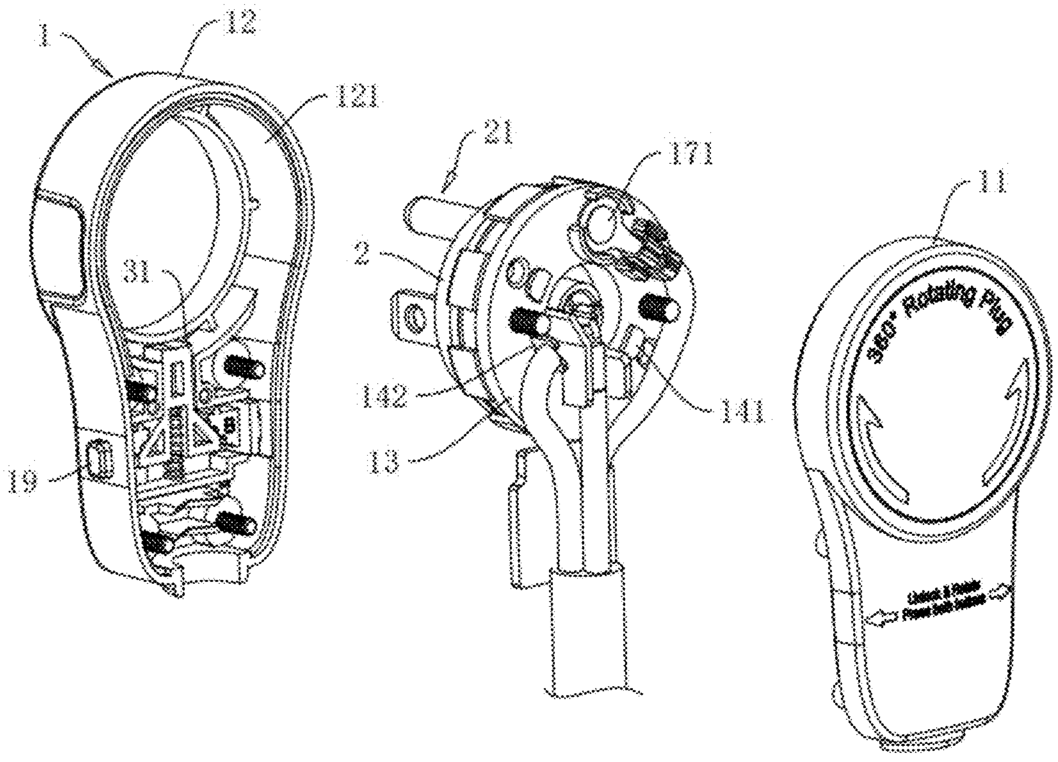
FIG. 2 is an exploded view 2 of a power plug according to an example of the disclosure herein.

Referring to FIGS. 1 and 2, the housing 1 includes a first shell 11 and a second shell 12. The first shell 11 and the second shell 12 are fixedly connected by bolts. A rotating groove 121 is provided on the side of the second shell 12 close to the first shell 11. The rotating member 2 is rotatably installed in the rotating groove 121. A rotating hole is provided at the bottom of the rotating groove 121. The rotating hole is concentric with the rotating member 2 and extends through the second shell 12. The pin 21 passes through the rotating hole and is in an overhanging state. The diameter of the rotating hole is smaller than a maximum outer diameter of the rotating member 2, preventing the rotating member 2 from being separated from the rotating groove 121 through the rotating hole.

In this example, the power plug is preferably a three-pin plug. To be specific, the pin 21 includes a first pin, a second pin, and a third pin, which are spaced apart on the rotating member 2. The first pin, the second pin, and the third pin are all inserted into the rotating member 2. In another embodiment, the pin 21 may alternatively be configured as including a first pin and a second pin. In yet another embodiment, there may be more than three pins 21. A first installation cavity is provided on the side of the first shell 11 close to the second shell 12. A conductive assembly electrically connected to the power line is installed in the first installation cavity. An accommodating groove is provided on the side of the rotating member 2 close to the first shell 11. The conductive assembly is partially located in the accommodating groove, to form a small overall space after the rotating member 2 and the conductive assembly are stacked together. One end of the first pin, the second pin, or the third pin is located in the accommodating groove and electrically connected to the conductive assembly.

Figure 3:
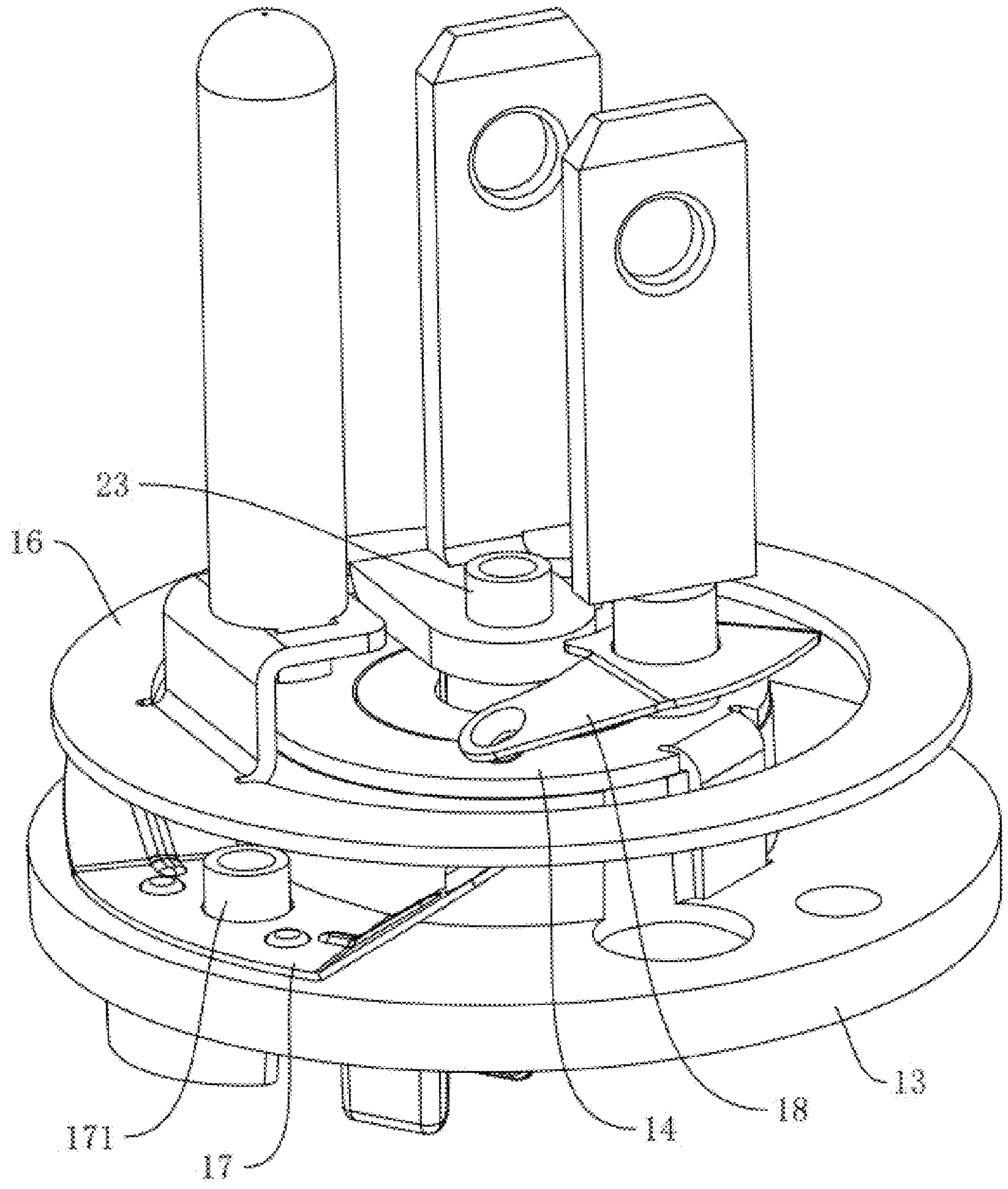
FIG. 3 is a structural diagram of a pin and a conductive assembly according to an example of the disclosure herein.
Figure 4:
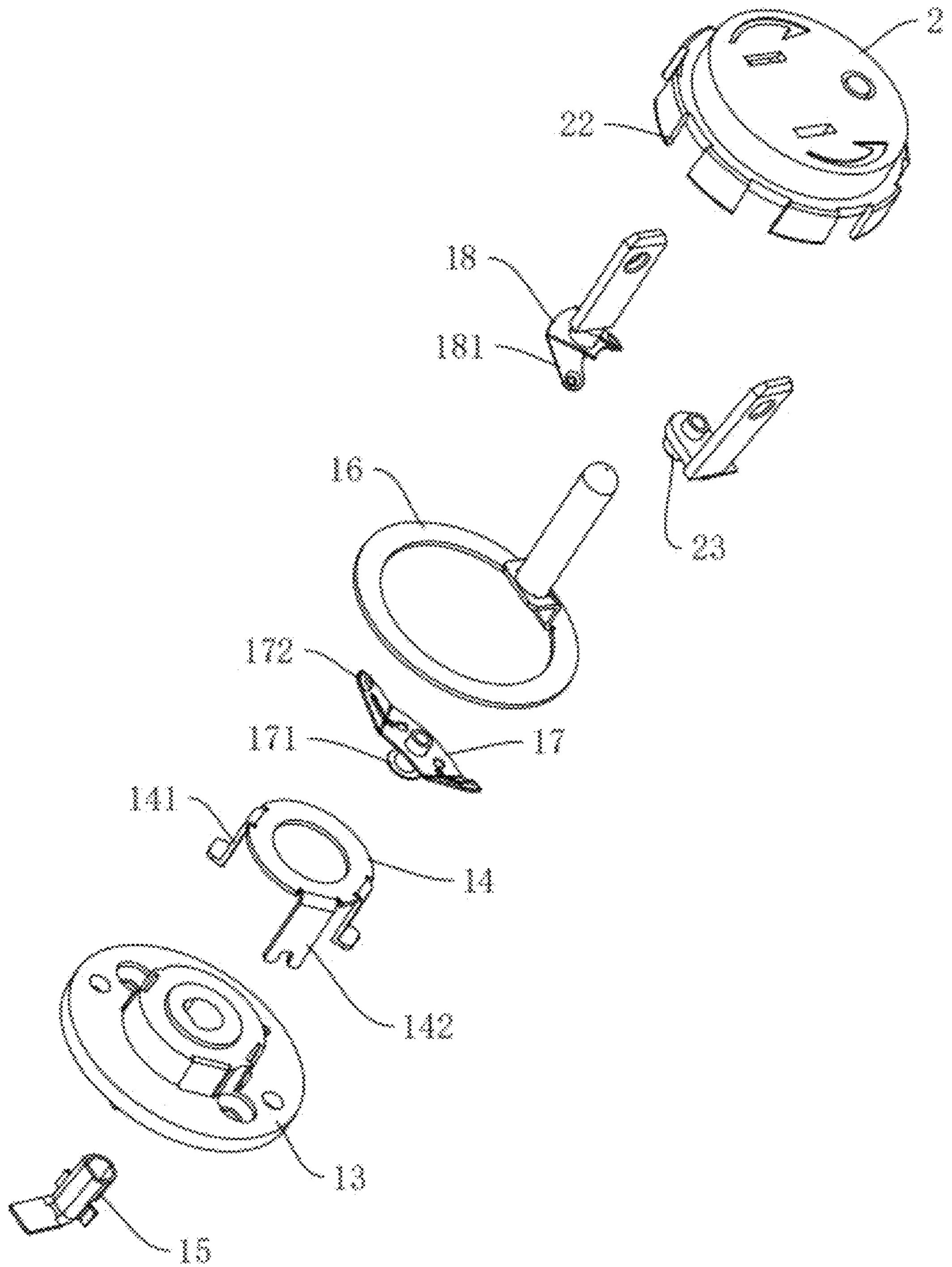
FIG. 4 is an exploded view of a pin and a conductive assembly according to an example of the disclosure herein.

Referring to FIGS. 2 to 4, the conductive assembly includes a base 13, a first conductive ring plate 14, a conductive pin 15, a second conductive ring plate 16, and a first conductive plate 17. The first conductive ring plate 14, the conductive pin 15, the second conductive ring plate 16, and the first conductive plate 17 are integrally installed on the base 13. The base 13 is made of plastic and installed in the first installation cavity via screws, thereby forming a module and improving assembly convenience. The first conductive ring plate 14, the conductive pin 15, and the first conductive plate 17 are spaced apart and all fixedly connected to the base 13, making it less likely for short circuits to occur due to electrical connection between adjacent pins 21.

The first conductive ring plate 14, the conductive pin 15, and the first conductive plate 17 are all connected to the power line. The first conductive ring plate 14 is located on the top of the base 13. An outer wall of the first conductive ring plate 14 is bent toward the first shell 11 to form a fixed leg 141 and a connecting leg 142. After passing through the base 13, the fixed leg 141 is bent to form a limiting flange, so that the first conductive ring plate 14 is fixedly connected to the base 13. The connecting leg 142 is connected to the power line after passing through the base 13, so that the entire first conductive ring plate 14 is energized.

The conductive pin 15 is inserted into and fixedly connected the base 13. Both ends of the conductive pin 15 are respectively located on the sides of the base 13 close to the first shell 11 and far from the first shell 11. The side of the conductive pin 15 close to the first shell 11 is connected to the power line. A conductive connecting column 171 is inserted into the side of the base 13 close to the first shell 11. The conductive connecting column 171 passes through the base 13. The first conductive plate 17 is located on the side of the base 13 far from the first shell 11 and outside the first conductive ring plate 14. The first conductive plate 17 is sleeved on the conductive connecting column 171 and fixed to the conductive connecting column 171 by soldering. The side of the conductive connecting column 171 close to the first shell 11 is connected to the power line. Two positioning holes are spaced apart on the first conductive late 17. Two positioning columns are integrally formed on the base 13. The two positioning columns are respectively inserted into the two positioning holes, preventing the first conductive plate 17 from rotating relative to the base 13. The second conductive ring plate 16 is fixedly installed in the accommodating groove, is connected to the rotating member 2, and rotates synchronously therewith.

Referring to FIGS. 2 to 4, the end of the first pin located in the accommodating groove is sleeved with a second conductive plate 18 which is fixed by soldering. When the rotating member 2 drives the first pin to rotate, the second conductive plate 18 keeps an electrical contact with the first conductive ring plate 14 all the time. An insertion chamber is integrally formed at the end of the conductive pin 15 close to the rotating member 2. A cooperating leg is bent on the side of the second pin located in the accommodating groove. A conductive column 23 is inserted into the cooperating leg and fixed by soldering. The conductive column 23 is inserted into the insertion chamber and closely attached to the conductive pin 15, and the cooperating leg and the conductive column 23 can rotate relative to the conductive pin 15. The second pin closely abuts against and keeps an electrical contact with the conductive pin 15 all the time. The third pin is fixedly connected to the second conductive ring plate 16 by soldering. When the rotating member 2 drives the first conductive ring plate 14 to rotate relative to the base 13, the second conductive ring plate 16 keeps an electrical contact with the first conductive plate 17. In this way, regardless of an angle at which the rotating member 2 drives the pin 21 to rotate, the pin 21 can keep a stable electrical connection with the power line.

Referring to FIGS. 2 to 4, the first conductive plate 17 is bent toward the second conductive ring plate 16 to form a plurality of first bent portions 172. The plurality of first bent portions 172 are all in an electrical contact with the second conductive ring plate 16, increasing electrical connection contacts between the first conductive plate 17 and the second conductive ring plate 16, thereby improving the stability of conduction to the pin 21. Similarly, the second conductive plate 18 is bent toward the first conductive ring plate 14 to form a plurality of second bent portions 181. The plurality of second bent portions 181 are all in an electrical contact with the first conductive ring plate 14. In this example, preferably, there are two first bent portions 172 and two second bent portions 181.

The first pin, the second pin, the third pin, the second conductive ring plate 16, the second conductive plate 18, and the conductive column 23 are integrated on the rotating member 2 to form a module, making assembly more convenient.

Figure 5:
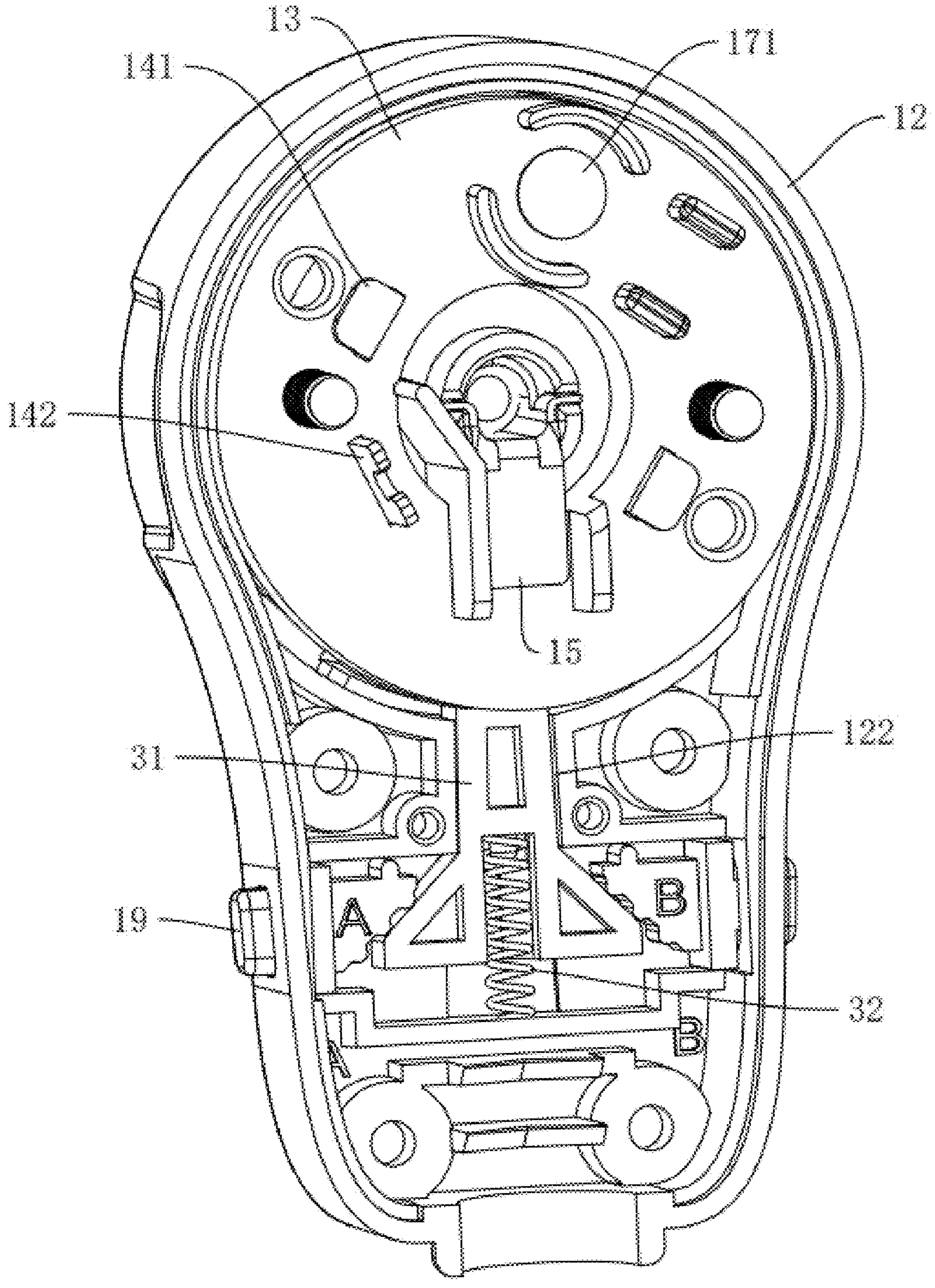
FIG. 5 is a structural diagram of a conductive assembly and a locking structure located in a second shell according to an example of the disclosure herein.
Figure 6:
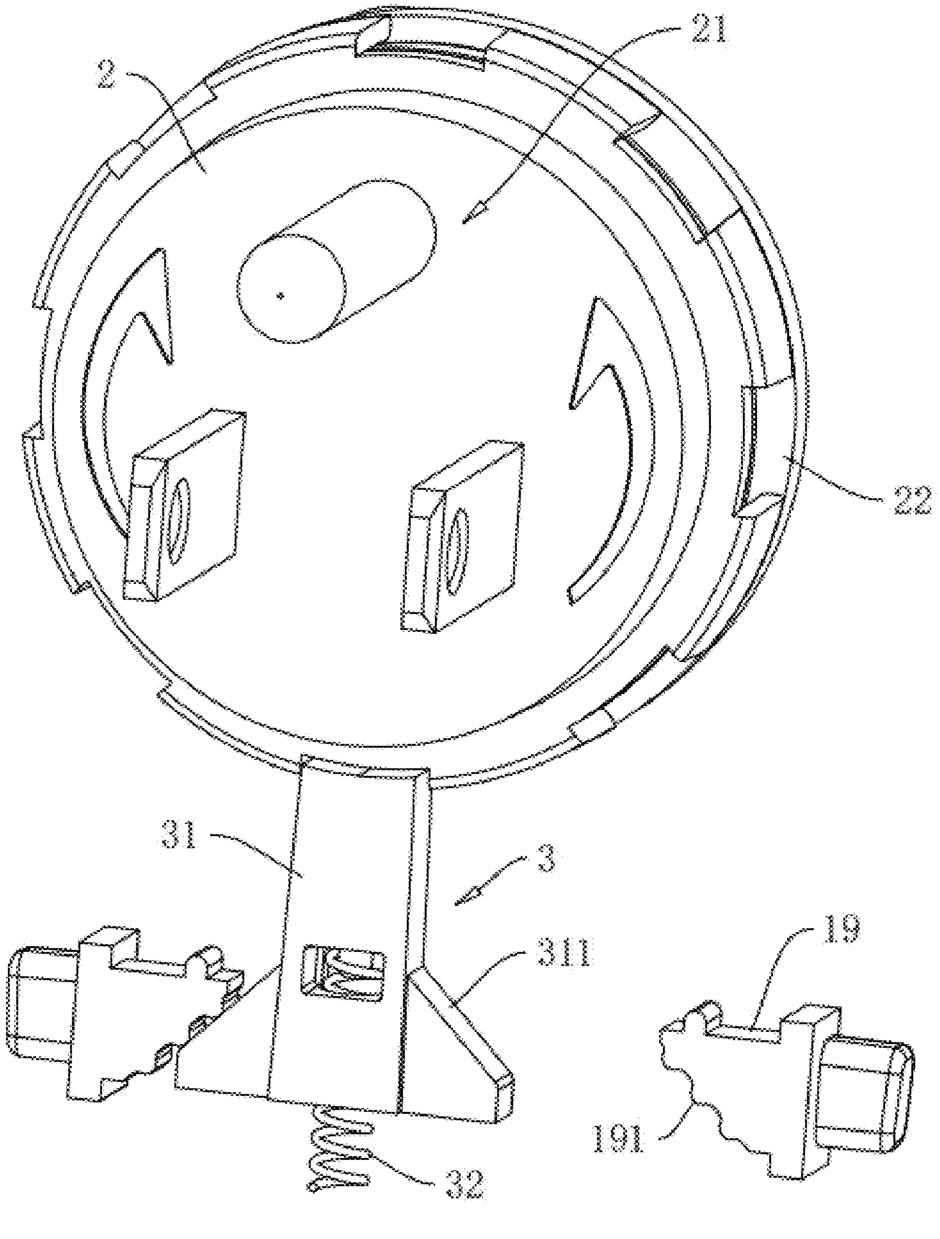
FIG. 6 is a structural diagram of a locking structure and a rotating member according to an example of the disclosure herein.

With reference to FIGS. 2, 5, and 6, the locking structure 3 includes a locking member 31 and an elastic member 32. The locking member 31 is slidably arranged in the second shell 12, and the locking member 31 is adapted to be inserted into the rotating member 2, so as to lock a relative rotation between the rotating member 2 and the housing 1. The elastic member 32 is in contact with the locking member 31 so as to drive the locking member 31 to keep the rotating member 2 in a locked state all the time, improving the stability after the locking member 31 locks the rotation of the rotating member 2. In another embodiment, the locking member 31 may be slidably arranged on the rotating member 2 and inserted into the second shell 12. In yet another embodiment, the locking member 31 may closely abut against the rotating member 2 to generate a damping force, and the locking is realized by virtue of the damping force.

A sliding groove 122 is provided on the side of the second shell 12 where the rotating groove 121 is provided. The sliding groove 122 is communicated with the rotating groove 121. The locking member 31 slides directionally in the sliding groove 122. A plurality of locking slots 22 are circumferentially spaced apart on an outer wall of the rotating member 2. The locking member 31 is adapted to be inserted into any one of the locking slots 22 to lock the rotation of the rotating member 2. The plurality of locking slots 22 are all communicated with the accommodating groove, so that heat of the conductive assembly can be dissipated, prolonging the service life of the conductive assembly. Stop blocks are integrally formed on both sides of the end of the locking member 31 far from the rotating member 2. The stop blocks cannot enter the sliding groove 122, preventing the locking member 31 from being inserted into the accommodating groove and interfering with the conductive assembly.

With reference to FIGS. 2, 5, and 6, an insertion groove is provided at the end of the locking member 31 far from the rotating member 2. In this example, the elastic member 32 is preferably a spring. The spring is inserted into the insertion groove, and the other end of the spring protrudes out of the insertion groove and abuts against the second shell 12, thereby driving the locking member 31 to have a tendency to approach the rotating member 2 and be inserted into the locking slot 22 all the time. In another example, the elastic member 32 may be a V-shaped elastic plate.

Unlocking buttons 19 are slidably arranged on two opposite side walls of the second shell 12. One end of the unlocking button 19 is in contact with the locking member 31, and the other end is exposed outside the housing 1. When a pressing force is applied to the unlocking button 19, the unlocking button 19 drives the locking member 31 to move, so that the locking member 31 is completely separated from the locking slot 22 to unlock the rotation of the rotating member 2. The arrangement of the two unlocking buttons 19 makes the locking member 31 stress evenly, so that the locking member 31 is not easy to get stuck due to uneven stress when moving for unlocking. The two unlocking buttons 19 have the same structure. The following description takes the cooperation of one unlocking button 19 and the locking member 31 as an example.

With reference to FIGS. 2, 5, and 6, a through hole is provided on the side wall of the second shell 12. One end of the unlocking button 19 passes through the through hole and is located outside the second shell 12 for a user to press. A stop flange is integrally formed on the outer wall of the unlocking button 19. The stop flange is located inside the second shell 12. The size of the stop flange is larger than that of the through hole, preventing the unlocking button 19 from being separated from the through hole. Each stop block is provided with an inclined surface 311. The inclined surface 311 gradually extends away from the side wall of the locking member 31 along the direction in which the locking member 31 moves out of the locking slot 22. The unlocking button 19 is provided with an inclined cooperating surface parallel to the inclined surface 311. A plurality of protrusions 191 are spaced apart on the inclined cooperating surface. The protrusions 191 abut against the inclined surface 311. The arrangement of the plurality of protrusions 191 not only ensures stable cooperation between the unlocking button 19 and the inclined surface 311, but also reduces the contact area between the unlocking button 19 and the inclined surface 311, thereby reducing friction, and making unlocking more labor-saving and smooth.

An implementation principle of the power plug capable of 360° rotation according to an example of the disclosure herein is as follows. The two unlocking buttons 19 are pressed to separate the locking member 31 from the locking slot 22. Then, the housing 1 is driven to rotate relative to the rotating member 2 and the pin 21 to adjust the orientation of the power line, and then the pressing force applied to the unlocking buttons 19 is removed. The locking member 31 will be automatically inserted into the corresponding locking slot 22 under the action of the elastic member 32 to lock the relative rotation between the housing 1 and the rotating member 2. Meanwhile, the unlocking button 19 will automatically reset under the action of the inclined surface 311 of the locking member 31. Therefore, the stability is improved after a rotation angle of the rotating member 2 driving the pin 21 is adjusted.

Equivalently, the components included in "assembly", "mechanism", and "apparatus" of the disclosure herein may alternatively be flexibly combined. To be specific, the components may be modularly produced according to actual needs and modularly assembled as an independent module. The components may alternatively be assembled separately to form a module in this apparatus. The division of the foregoing components in the disclosure herein is only one of the examples, intended for the convenience of reading rather than limiting the scope of protection of the disclosure herein. As long as the foregoing components are included and the functions are the same, it should be understood as an equivalent technical solution of the disclosure herein.

In the description of the disclosure herein, it should be understood that orientations or position relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", and "circumferential" are orientations or position relationships shown based on the accompanying drawings, and are merely used for describing the disclosure herein and simplifying the description, rather than indicating or implying that the apparatus or element should have a particular orientation or be constructed and operated in a particular orientation, and therefore, should not be construed as a limitation on the disclosure herein.

Furthermore, terms such as "first" and "second" are only used for descriptive purposes, and should not be understood as indicating or implying relative importance or implicitly specifying the number of the indicated technical features. Therefore, the features defined with "first" and "second" may explicitly or implicitly include at least one such feature. In the description of the disclosure herein, unless explicitly specified, "plurality of" means at least two, for example, two or three.

In the disclosure herein, unless otherwise clearly specified and defined, terms such as "installation", "connected", "connection", and "fixed" should be understood in a broad sense. For example, the connection may be a fixed connection, a detachable connection, or an integral connection. The connection may be a mechanical connection or an electrical connection. The connection may be a direct connection, an indirect connection through an intermediary, an internal communication between two elements, or an interaction relationship between two elements, unless otherwise clearly defined. Those of ordinary skill in the art may understand specific meanings of the foregoing terms in the disclosure herein in specific situations.

In the disclosure herein, unless otherwise explicitly specified and limited, a first feature being located "on" or "beneath" a second feature may be the first feature being in a direct contact with the second feature, or the first feature being in an indirect contact with the second feature through an intermediary. Furthermore, a first feature being "above", "over", and "on" a second feature may mean that the first feature is directly above or obliquely above the second feature, or simply means that a horizontal height of the first feature is larger than that of the second feature. A first feature being "below", "under", and "beneath" a second feature may mean that the first feature is directly below or obliquely below the second feature, or simply means that a horizontal height of the first feature is smaller than that of the second feature.

It should be noted that when an element is referred to as being "fixed to", "arranged on", "fixedly arranged on", or "installed on" another element, the element may be directly located on the other element or an intervening element may alternatively be present. When being considered to be "connected" to another element, an element may be directly connected to another element, or an intervening element may be present. Further, when an element is considered to be "fixedly connected" to another element, the two elements may be fixed in a detachable connection manner or a non-detachable connection manner, such as sleeving, clamping, integral forming fixation, or welding. These connection manners may be realized in the traditional technology. Details are not described herein again.

The technical features of the foregoing examples may be combined in any manner. For the sake of brevity, not all possible combinations of the technical features in the foregoing examples have been described. However, any combination of these technical features should be considered within the scope of this specification, provided that no contradiction arises.

The foregoing examples only represent several embodiments of the disclosure herein, and their descriptions are relatively specific and detailed, but should not be construed as limiting the patent scope of the disclosure herein. It should be noted that for a person of ordinary skill in the art, several transformations and improvements may be made without departing from the idea of the disclosure herein. These transformations and improvements belong to the protection scope of the disclosure herein.

What is claimed is:

1. A power plug capable of 360° rotation, comprising a housing (1), a rotating member (2), and a locking structure (3), wherein the rotating member (2) is rotatably connected to the housing (1), the rotating member (2) is provided with a pin (21), the pin (21) rotates synchronously with the rotating member (2), the locking structure (3) comprises a locking member (31) slidably connected to either the housing (1) or the rotating member (2), and the locking member (31) is adapted to lock or unlock a relative rotation between the rotating member (2) and the housing (1);

wherein an unlocking button (19) is slidably arranged on the housing (1), one end of the unlocking button (19) is in contact with the locking member (31), and another end is exposed outside the housing (1); and when a pressing force is applied to the unlocking button (19), the unlocking button (19) drives the locking member (31) to move, so as to unlock the rotation of the rotating member (2);

wherein the locking member (31) is provided with an inclined surface (311), and the one end of the unlocking button (19) abuts against the inclined surface (311) so as to drive the locking member (31) to move; and wherein the unlocking button (19) is provided with an inclined cooperating surface parallel to the inclined surface (311), a plurality of protrusions (191) are spaced apart on the inclined cooperating surface, and the protrusions (191) abut against the inclined surface (311).

2. The power plug capable of 360° rotation according to claim 1, wherein the locking member (31) is slidably arranged in the housing (1), a plurality of locking slots (22) are circumferentially spaced apart on an outer wall of the rotating member (2), and the locking member (31) is adapted to be inserted into any one of the locking slots (22) to lock the rotation of the rotating member (2).

3. The power plug capable of 360° rotation according to claim 1, wherein the locking structure (3) further comprises an elastic member (32), and the elastic member (32) is in contact with the locking member (31) so as to drive the locking member (31) to keep the rotating member (2) in a locked state all the time.

4. The power plug capable of 360° rotation according to claim 1, wherein the housing (1) comprises a first shell (11) and a second shell (12) connected to the first shell (11), a rotating groove (121) is provided on a side of the second shell (12) close to the first shell (11), the rotating member (2) is rotatably installed in the rotating groove (121), the locking member (31) is directionally slidably arranged in the second shell (12), a rotating hole for the pin (21) to pass through is provided at the bottom of the rotating groove (121), and the rotating hole extends through the second shell (12).

5. The power plug capable of 360° rotation according to claim 4, wherein the pin (21) comprises a first pin, a second pin, and a third pin, which are spaced apart, a conductive assembly electrically connected to a power line is arranged on a side of the first shell (11) close to the second shell (12), and the first pin, the second pin, and the third pin are all electrically connected to the conductive assembly.

6. The power plug capable of 360° rotation according to claim 5, wherein the conductive assembly comprises a base (13), a first conductive ring plate (14), a conductive pin (15), a second conductive ring plate (16), and a first conductive plate (17), which are integrally installed on the base (13); the first conductive ring plate (14), the conductive pin (15), and the first conductive plate (17) are spaced apart and all fixedly connected to the base (13), and the first conductive ring plate (14), the conductive pin (15), and the first conductive plate (17) are all connected to the power line; the second conductive ring plate (16) is connected to the rotating member (2) and rotates synchronously therewith, the third pin is fixedly connected to the second conductive ring plate (16), and the second conductive ring plate (16) keeps an electrical contact with the first conductive plate (17) all the time when rotating relative to the base (13); when the rotating member (2) drives the first pin to rotate, the first pin keeps an electrical contact with the first conductive ring plate (14) all the time; and the conductive pin (15) is formed with an insertion chamber, the second pin is fixedly provided with a conductive column (23), and the conductive column (23) is rotatably inserted into the insertion chamber and keeps an electrical contact with the conductive pin (15) all the time.

7. The power plug capable of 360° rotation according to claim 6, wherein the first conductive plate (17) is bent to form a plurality of first bent portions (172), and the plurality of first bent portions (172) are all in electrical contact with the second conductive ring plate (16); and a second conductive plate (18) is fixedly connected to the first pin, the second conductive plate (18) is bent to form a plurality of second bent portions (181), and the plurality of second bent portions (181) are all in electrical contact with the first conductive ring plate (14).

8. The power plug capable of 360° rotation according to claim 2, wherein the housing (1) comprises a first shell (11) and a second shell (12) connected to the first shell (11), a rotating groove (121) is provided on a side of the second shell (12) close to the first shell (11), the rotating member (2) is rotatably installed in the rotating groove (121), the locking member (31) is directionally slidably arranged in the second shell (12), a rotating hole for the pin (21) to pass through is provided at the bottom of the rotating groove (121), and the rotating hole extends through the second shell (12).

9. The power plug capable of 360° rotation according to claim 8, wherein the pin (21) comprises a first pin, a second pin, and a third pin, which are spaced apart, a conductive assembly electrically connected to a power line is arranged on a side of the first shell (11) close to the second shell (12), and the first pin, the second pin, and the third pin are all electrically connected to the conductive assembly.

10. The power plug capable of 360° rotation according to claim 9, wherein the conductive assembly comprises a base (13), a first conductive ring plate (14), a conductive pin (15), a second conductive ring plate (16), and a first conductive plate (17), which are integrally installed on the base (13); the first conductive ring plate (14), the conductive pin (15), and the first conductive plate (17) are spaced apart and all fixedly connected to the base (13), and the first conductive ring plate (14), the conductive pin (15), and the first conductive plate (17) are all connected to the power line; the second conductive ring plate (16) is connected to the rotating member (2) and rotates synchronously therewith, the third pin is fixedly connected to the second conductive ring plate (16), and the second conductive ring plate (16) keeps an electrical contact with the first conductive plate (17) all the time when rotating relative to the base (13); when the rotating member (2) drives the first pin to rotate, the first pin keeps an electrical contact with the first conductive ring plate (14) all the time; and the conductive pin (15) is formed with an insertion chamber, the second pin is fixedly provided with a conductive column (23), and the conductive column (23) is rotatably inserted into the insertion chamber and keeps an electrical contact with the conductive pin (15) all the time.

11. The power plug capable of 360° rotation according to claim 10, wherein the first conductive plate (17) is bent to form a plurality of first bent portions (172), and the plurality of first bent portions (172) are all in electrical contact with the second conductive ring plate (16); and a second conductive plate (18) is fixedly connected to the first pin, the second conductive plate (18) is bent to form a plurality of second bent portions (181), and the plurality of second bent portions (181) are all in electrical contact with the first conductive ring plate (14).

12. The power plug capable of 360° rotation according to claim 3, wherein the housing (1) comprises a first shell (11) and a second shell (12) connected to the first shell (11), a rotating groove (121) is provided on a side of the second shell (12) close to the first shell (11), the rotating member (2) is rotatably installed in the rotating groove (121), the locking member (31) is directionally slidably arranged in the second shell (12), a rotating hole for the pin (21) to pass through is provided at the bottom of the rotating groove (121), and the rotating hole extends through the second shell (12).

13. The power plug capable of 360° rotation according to claim 12, wherein the pin (21) comprises a first pin, a second pin, and a third pin, which are spaced apart, a conductive assembly electrically connected to a power line is arranged on a side of the first shell (11) close to the second shell (12), and the first pin, the second pin, and the third pin are all electrically connected to the conductive assembly.

14. The power plug capable of 360° rotation according to claim 13, wherein the conductive assembly comprises a base (13), a first conductive ring plate (14), a conductive pin (15), a second conductive ring plate (16), and a first conductive plate (17), which are integrally installed on the base (13); the first conductive ring plate (14), the conductive pin (15), and the first conductive plate (17) are spaced apart and all fixedly connected to the base (13), and the first conductive ring plate (14), the conductive pin (15), and the first conductive plate (17) are all connected to the power line; the second conductive ring plate (16) is connected to the rotating member (2) and rotates synchronously therewith, the third pin is fixedly connected to the second conductive ring plate (16), and the second conductive ring plate (16) keeps an electrical contact with the first conductive plate (17) all the time when rotating relative to the base (13); when the rotating member (2) drives the first pin to rotate, the first pin keeps an electrical contact with the first conductive ring plate (14) all the time; and the conductive pin (15) is formed with an insertion chamber, the second pin is fixedly provided with a conductive column (23), and the conductive column (23) is rotatably inserted into the insertion chamber and keeps an electrical contact with the conductive pin (15) all the time.

15. The power plug capable of 360° rotation according to claim 14, wherein the first conductive plate (17) is bent to form a plurality of first bent portions (172), and the plurality of first bent portions (172) are all in electrical contact with the second conductive ring plate (16); and a second conductive plate (18) is fixedly connected to the first pin, the second conductive plate (18) is bent to form a plurality of second bent portions (181), and the plurality of second bent portions (181) are all in electrical contact with the first conductive ring plate (14).

* * * * *